United States Patent [19]

D'Agosto, III et al.

[11] Patent Number: 4,790,002

[45] Date of Patent: Dec. 6, 1988

[54] TELEPHONE DEVICE AND METHOD FOR OPERATING A TELEPHONE DEVICE

[75] Inventors: Nicholas A. D'Agosto, III, Trumbull; David B. Chamberlin, Milford, both of Conn.

[73] Assignee: Dictaphone Corporation, Rye, N.Y.

[21] Appl. No.: 894,549

[22] Filed: Aug. 8, 1986

[51] Int. Cl.$^4$ .................... H04M 1/65; H04M 9/08
[52] U.S. Cl. ........................ 379/70; 379/387
[58] Field of Search .............. 379/67, 68, 75, 70, 379/74, 77, 78, 79, 82, 388-390, 420; 369/25, 29

[56] References Cited

U.S. PATENT DOCUMENTS

| | | | |
|---|---|---|---|
| 3,833,766 | 9/1974 | Eklof et al. | 379/390 |
| 4,328,397 | 5/1982 | Chamberlin | 379/75 |
| 4,421,954 | 12/1983 | Mita et al. | 379/82 |
| 4,517,413 | 5/1985 | Pavitt, Jr. | 379/110 |

FOREIGN PATENT DOCUMENTS 2075304 11/1981 United Kingdom .
2188513 3/1986 United Kingdom .

OTHER PUBLICATIONS

*Radio Shack* 1984 *Catalog*, © 1983, Tandy Corporation, Fort Worth, Texas 76102, p. 102.

Primary Examiner—Raymond F. Cardillo
Assistant Examiner—James E. Tomassini
Attorney, Agent, or Firm—Robert H. Whisker; Melvin J. Scolnick; David E. Pitchenik

[57] ABSTRACT

A telephone terminal or a combined telephone-dictation terminal is disclosed. Such telephone apparatus includes a handset having a microphone and a speaker together with a speakerphone having a microphone and a speaker. Such telephone apparatus also includes a hook switch, which detects on-hook and off-hook conditions of the handset, a speakerphone switch, and a control mechanism, which is responsive to the hook switch and the speakerphone switch. The control mechanism may successively enable and disable at least one of the speakerphone microphone and the speakerphone speaker in response to successive operations of the speakerphone switch during the on-hook condition. Preferably, such a control mechanism (a) enables the speakerphone microphone and the speakerphone speaker when the speakerphone switch is operated a first time during the on-hook condition; (b) disables the speakerphone microphone when the speakerphone switch is operated a second time during the on-hook condition; and (c) reenables the speakerphone microphone when the speakerphone switch is operated a third time during the on-hook condition. The control mechanism may enable the headset microphone and the headset speaker in response to a change from the on-hook condition to the off-hook condition and then enable the speakerphone speaker when the speakerphone switch is operated a first time during the on-hook condition. Such a control mechanism desirably disables the headset microphone when the speakerphone switch is operated a second time during the off-hook condition and reenables the headset microphone when the speakerphone switch is operated a third time during the off-hook condition.

34 Claims, 6 Drawing Sheets

TELEPHONE DEVICE AND METHOD FOR OPERATING A TELEPHONE DEVICE

BACKGROUND OF THE INVENTION

This invention relates to telephonic communication devices for transmitting and receiving audio signals and, more particularly, to a telephone terminal or a combined telephone-dictation terminal which is conveniently operated and used. The present invention also relates to a method of programming and operating such a terminal.

The present invention relates to and is usable in a modular dictating system of the type described generally in co-pending application Ser. No. 895,006, entitled "Modular Dictation/Transcription System", filed on Aug. 8, 1986; application Ser. No. 895,017, entitled "Programmable Telephone/Dictation Terminal and Method of Operating Same", filed Aug. 8, 1986; and application Ser. No. 895,010, entitled "Communications Network and Method", filed Aug. 8, 1986; said applications being assigned to the assignee of the present invention, the disclosures of said applications hereby being incorporated herein by reference.

Speakerphones are being utilized more and more in offices and elsewhere. However, many people are reluctant to talk to someone who is using a speakerphone. That is, the other's use of a speakerphone presents a psychological drawback to such people. For instance, such people may dislike the tone or pitch of the received audio signals, which may sound as if the speaker is located inside of a barrel. In addition, such people may object to the lack of privacy when the other party employs a speakerphone. In other words, such people may have a psychological impediment to freely communicating when they realize that they are speaking to more than one person.

Typically, a speakerphone mode is initiated by pressing a first key, e.g., a SPEAKER key, on a telephone terminal, and a mute mode is initiated by pressing a second key, e.g., a MUTE key, on the telephone terminal. However, with advances in technology, the telephone terminals are being offered with a greater number of features than in the past. These features are initiated by pressing a key or several keys on the telephone terminal. Accordingly, keyboards for telephone terminals are rapidly becoming complex as the number of required keys increases. A large number of keys on a keyboard may be bewildering to a user. Thus, a need exists to simplify telephone keyboards by using fewer keys.

Often, a transcriptionist will remove a headset in order to answer an incoming telephone call. Specifically, when the transcriptionist hears the telephone ringing, he or she will remove the headset for the dictating machine and pick up the receiver, or handset, of the telephone. Once the call is completed and the receiver is hung up, the transcriptionist must replace the headset. The removal and replacement of the headset are inconvenient. Moreover, the removal and replacement of the headset waste time. Accordingly, a need exists for a device and an associated method which permit a transcriptionist to easily answer an incoming telephone call without inconvenience or delay.

OBJECTS OF THE INVENTION

In general, an object of the invention is to provide equipment and methods which overcome the foregoing problems and satisfy the foregoing needs. More specifically, an object of the invention is to provide a telephone terminal or a combined telephone-dictation terminal that is easily operable by a user.

Another object of the invention is to provide a telephonic device with better audio quality.

Yet another object of the invention is to provide a telephonic device having few, if any, psychological drawbacks.

Still another object of the invention is to provide a telephonic device which enables oral communications or messages to be conveniently transcribed.

An additional object of the invention is to provide a simpler, easier to use keyboard for controlling a speakerphone.

An additional object of the invention is to provide a telephonic device which readily permits a transcriptionist to answer an incoming telephone call.

A further object of the invention is to provide a telephonic device which permits a plurality of people to listen to a telephone conversation without a reduction in quality of the reproduced audio signals.

A still further object of the invention is to provide suitable methods for programming and operating devices of the type mentioned above.

Various other objects, advantages, and features of the present invention will become apparent from the ensuing detailed description, and the novel features will be particularly pointed out in the appended claims.

SUMMARY OF THE INVENTION

In accordance with one aspect of the invention, in which a single key is employed to control speakerphone operations, a telephone apparatus includes a handset having a microphone and a speaker together with a speakerphone having a microphone and a speaker. The telephone apparatus also includes a hook switch, which detects on-hook and off-hook conditions of the handset, and a speakerphone switch. In addition, the telephone apparatus includes a control mechanism, which is responsive to the hook switch and the speakerphone switch. The control mechanism successively enables at least one of the speakerphone microphone and the speakerphone speaker in response to successive operations of the speakerphone switch during the on-hook condition. Preferably, the control mechanism (a) enables the speakerphone microphone and the speakerphone speaker when the speakerphone switch is operated a first time during the on-hook condition; (b) disables the speakerphone microphone when the speakerphone switch is operated a second time during the on-hook condition; and (c) reenables the speakerphone microphone when the speakerphone switch is operated a third time during the on-hook condition.

In accordance with another aspect of the invention, in which a telephone handset is used along with a speakerphone speaker, a telephone apparatus includes a handset having a microphone and a speaker as well as a speakerphone having a microphone and a speaker. In addition, the telephone apparatus includes a hook switch, which detects on-hook and off-hook conditions of the handset, and a speakerphone switch. Furthermore, the telephone apparatus includes a control mechanism, which is responsive to the hook switch and the speakerphone switch. The control mechanism enables the handset microphone and the handset speaker in response to a change from the on-hook condition to the off-hook condition, and it then enables the speakerphone speaker when the speakerphone switch is operated a first time during the on-hook condition. The control mechanism desirably disables the handset microphone when the speakerphone switch is operated a second time during the off-hook condition and reenables the handset microphone when the speakerphone switch is operated a third time during the off-hook condition.

In accordance with an additional aspect of the invention, in which a headset is used together with speakerphone components, a telephone apparatus includes a handset having a microphone and a speaker, a speakerphone having a microphone and a speaker, and a selectively connectable headset having a speaker. The telephone apparatus further includes a hook switch for detecting on-hook and off-hook conditions of the handset, a speakerphone switch, and a headset switch with a first state and a second state. Moreover, the telephone apparatus includes a control mechanism, which is responsive to the hook switch and to the speakerphone and headset switches. The control mechanism enables the speakerphone microphone and the speakerphone speaker when the speakerphone switch is operated a first time during the on-hook condition while the headset switch is in the first state. Additionally, the control mechanism enables the speakerphone microphone and the headset speaker when the speakerphone switch is operated a first time during the on-hook condition while the headset switch is in the second state. The control mechanism advantageously disables the speakerphone microphone when the speakerphone switch is operated a second time during the on-hook condition while the headset switch is in the second state and reenables the speakerphone microphone when the speakerphone switch is operated a third time during the on-hook condition while the headset switch is in the second state. The control mechanism may enable the handset microphone and the handset speaker in response to a change from the on-hook condition to the off-hook condition while the headset switch is in the second state and subsequently enable the speakerphone speaker when the speakerphone switch is operated a first time during the off-hook condition while the headset switch is in the second state. The control mechanism desirably enables the speakerphone microphone and the headset speaker and disables handset microphone, the handset speaker, and the speakerphone speaker, assuming that the speakerphone speaker was previously enabled, in response to a change from the off-hook condition to the on-hook condition while the headset switch is in the second state.

Preferably, a telephone terminal or a combined telephone-dictation terminal according to the invention has circuits that automatically dial a preselected telephone number and enable the speakerphone microphone and the speakerphone speaker, thereby initiating the speakerphone mode, in response to the operation of a single key or pushbutton.

The invention may be employed in a modular telephone/dictation system capable of carrying out different system operating functions, including a dictation function and a telecommunication function. Such a system has a recording module for recording dictation on a record medium and a physically independent communication module connectable to the recording module to form an integral structure therewith and for transmitting and receiving audio signals telephonically. The communiction module for the system includes a handset having a first microphone and first speaker; speakerphone means having a second microphone and a second speaker; a hook switch for detecting on-hook and off-hook conditions of the handset; a speakerphone switch; and a control device that is responsive to the hook switch and the speakerphone switch. The control device may (a) enable the second microphone and the second speaker when the speakerphone switch is operated a first time during the on-hook condition; (b) disable the second microphone when the speakerphone switch is operated a second time during the on-hook condition; and (c) reenables the second microphone when the speakerphone switch is operated a third time during the on-hook condition. Furthermore, the control device may enable the first microphone and the first speaker in response to a change from the on-hook condition to the off-hook condition and subsequently enable the second speaker when the speakerphone switch is operated a first time during the off-hook condition.

The invention also includes methods for operating and programming equipment of the type described above.

A telephone device according to the invention improves the communications for the user. For instance, the user may enable the speakerphone speaker while using the handset. Accordingly, other people in the room may listen to the other party on the telephone call. However, since the handset microphone is enabled and the user speaks into it, rather than into the speakerphone microphone, the other party simply perceives that a normal telephone call is taking place. That is, the tone and pitch of the signals he or she hears is normal; no "barrel-like" effect is heard by the other party. Consequently, if the other party is reluctant to be placed on a speakerphone because he or she dislikes the quality of the sound, he or she will not object to the use of the speakerphone speaker.

A telephone device according to the invention simplifies keyboard operations for a user. A single key on the keyboard may be successively actuated during the speakerphone mode to disable and reenable the speakerphone speaker, thus entering and leaving, respectively, an on-hook mute mode. The use of a single key to switch between these modes reduces the complexity of the keyboard.

BRIEF DESCRIPTION OF THE DRAWINGS

The above and other features and advantages of the invention will become apparent upon consideration of the following detailed description of illustrative embodiments thereof, especially when taken in conjunction with the accompanying drawings, wherein.

DETAILED DESCRIPTION OF THE PREFERRED EMBODIMENTS

General Description of the Transceiver Unit

Figure 1:
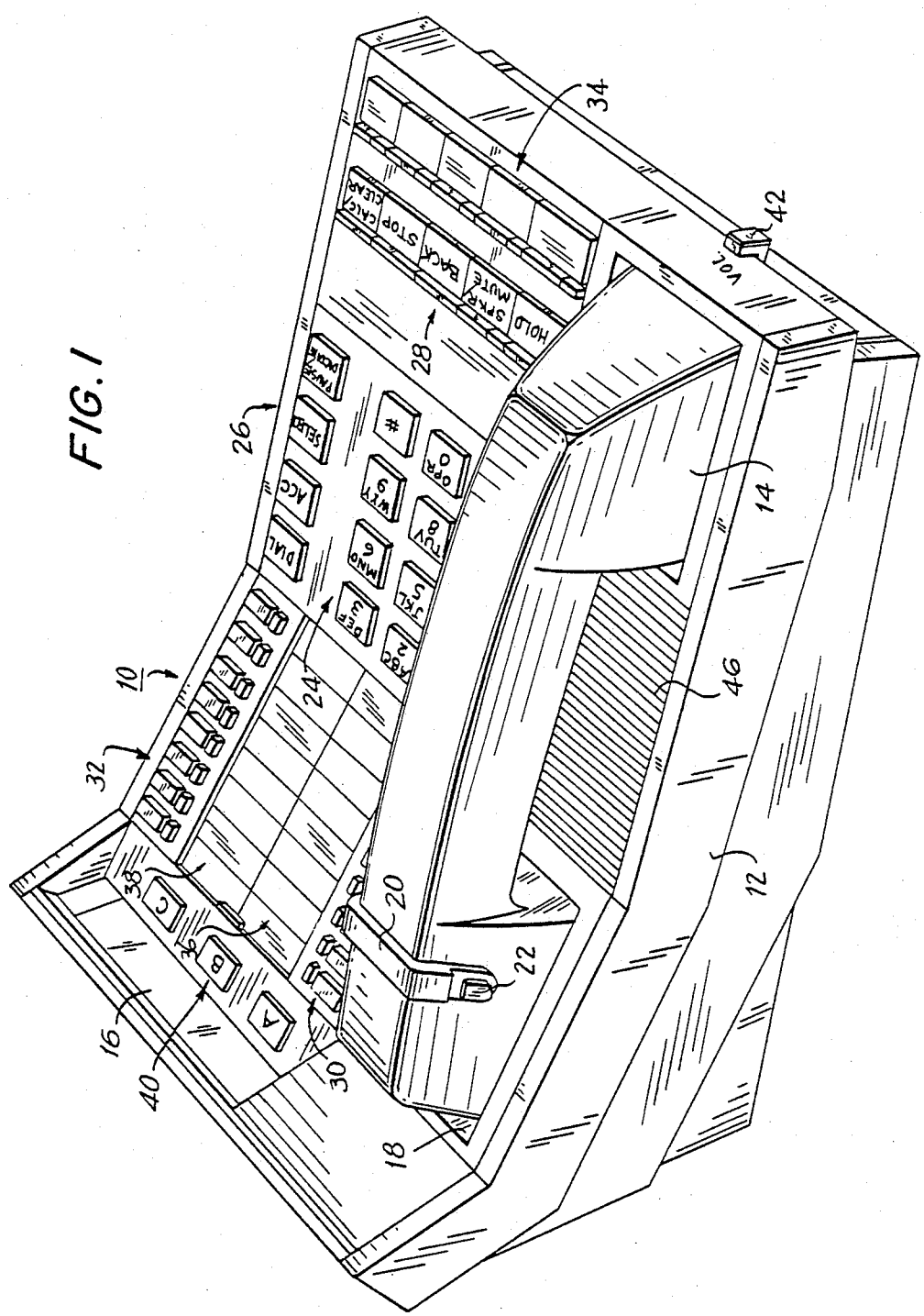
FIG. 1 is a perspective view of a transceiver unit ("C" unit) used in the present invention.
Figure 2:
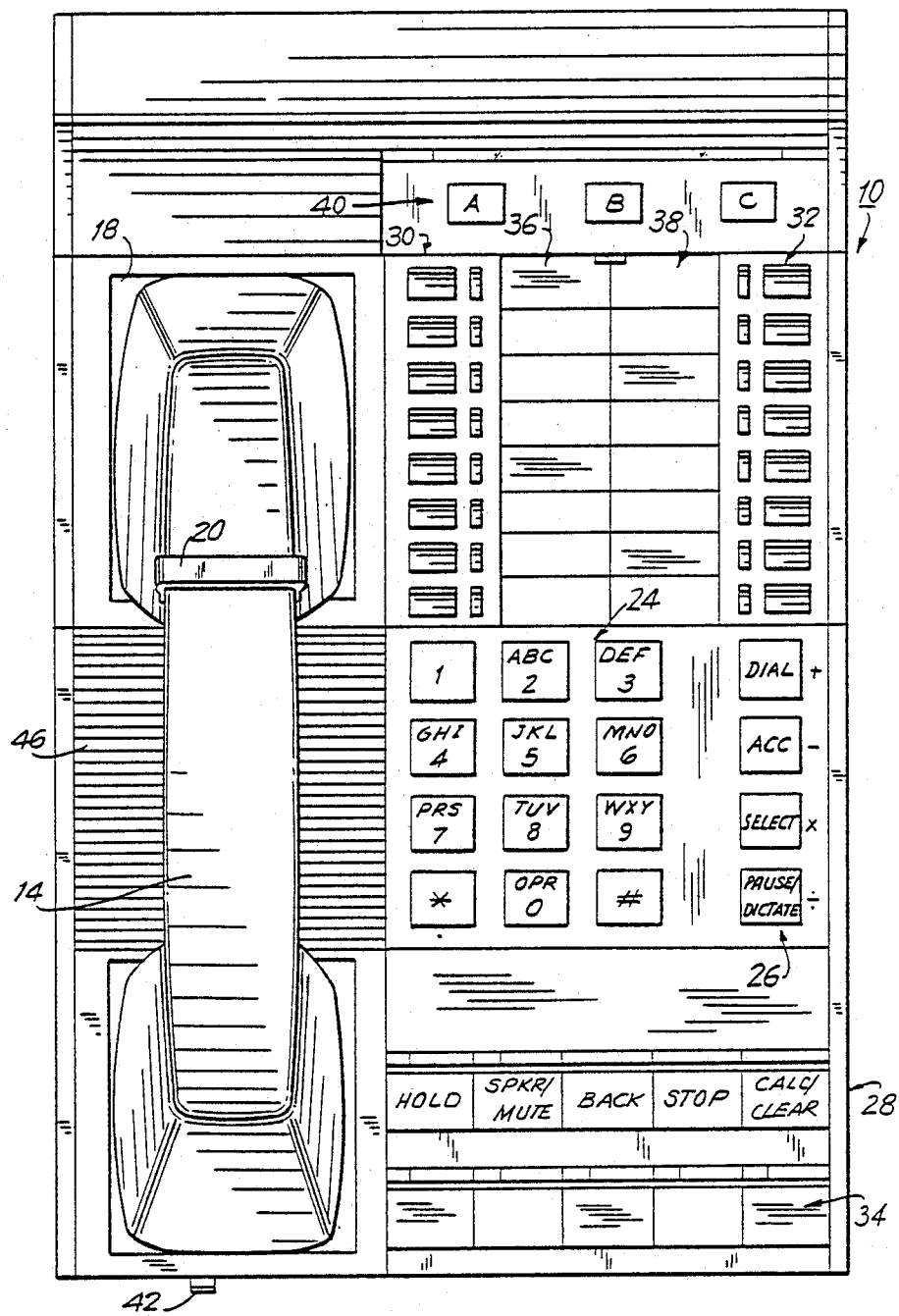
FIG. 2 is a top plan view of the transceiver unit shown in FIG. 1.

FIGS. 1 and 2 of the drawings show a transceiver unit 10 in some detail. The unit 10 is shown and described in even greater detail in co-pending application Ser. No. 895,017, the disclosure of which hereby is incorporated herein by reference, as well as co-pending application Ser. No. 895,010, the disclosure of which hereby is incorporated herein by reference. Transceiver unit 10 includes a housing 12 containing electrical circuitry. As it will be described in detail below, such circuitry includes a microprocessor, such as the Hitachi Model 6303. Other circuitry is shown in block diagram form in FIG. 4.

Handset

Transceiver unit 10 is provided with a handset 14 having a speaker (108 in FIG. 4) and a microphone (106 in FIG. 4), similar to handsets normally provided in conventional telephone instruments except for the dictation controls, which are described in greater detail below. Handset 14 is held in a cradle 18 which includes a hook switch (not shown in FIGS. 1-3) whose function is similar to the conventional hook switch normally provided in telephones. When handset 14 is in the cradle 18, the hook switch is open and the handset is in its "on-hook" condition, and when handset 14 is removed from cradle 18, the hook switch is closed and the handset is in its "off-hook" condition.

Handset 14 differs from conventional telephone handsets in that it has a dictation control yoke 20 and a dictation control button 22 for the purpose of controlling various dictation functions. Such a handset is shown, for example, in U.S. Pat. No. 3,872,263, assigned to the assignee of the present invention. Yoke 20 is spring-loaded and causes magnetic tape in a dictation machine (not shown in FIGS. 1 and 2) to rewind when moved by an operator (if it is moved to the left as seen in FIG. 1) and stops movement of the tape when moved in the opposite direction. Dictate control button 22 is depressed to start dictation.

Display

The display 16 of the transceiver unit 10 comprises an LCD display capable of displaying two lines of 16 alphanumeric characters each. Each character is formed by energizing various parts of a 5×7 dot matrix. However, other alphanumeric displays may be provided, as desired, such as LED, fluorescent, incandescent, and plasma displays. Additionally, if economically acceptable, display 16 may comprise a "mini" CRT device.

Telephone Keypad

On the outer surface of the housing 12 of transceiver unit 10 are located various keys, including a conventional pushbutton telephone keypad 24, preset function keys 26 and 28, user-programmable keys 30, 32 and 34, and "soft" keys 40. A user of the transceiver unit 10 may initiate a telephone call by depressing appropriate ones of these pushbuttons to "dial" a desired telephone number and provide either "Touch Tone" signals or conventional dialing pulses.

As will be described below, keypad 24 also may be operated as a calculator, or to generate alphanumerical characters for display.

Preset Function Keys

Preset function keys 26 and 28 preferably are provided in separate arrays, with keys 26 being arranged in a column adjacent keypad 24 and keys 28 being arranged in a row in the vicinity of the front, or leading edge, of the unit or terminal 10.

Function keys 26 include a DIAL key which, when actuated, commands an automatic dial-out operation. As noted above, the transceiver unit 10 includes automatic dialing means which, when operated, results in the display of a particular telephone number. Once a telephone number is displayed, the actuation of the DIAL key causes the tones or pulses corresponding to the displayed telephone number to be generated. Also, terminal 10 permits the automatic re-dialing of the telephone number last dialed. While in the on-hook idle condition, actuation of the DIAL key causes the last-dialed number to be displayed on display 16. Re-actuation of the DIAL key results in the actual dialing of the displayed number.

Function keys 26 also include an ACC key which, for example, may be actuated to initiate the operation of a telephone accessory, such as a printer, that may be connected to the terminal 10. The connection of such accessories is shown and described in greater detail in application Ser. No. 895,010.

A SELECT key also is included in the function keys 26. The SELECT key is operable during a programming mode, which is described in greater detail in application Ser. No. 895,017 as well as application Ser. No. 895,010. For example, when entering desired telephone numbers for use by the aforementioned automatic dialing means included in terminal 10, operation of the SELECT key is indicative of the end of a desired number (which may be, for example, a 2-, 3-, 4-, 5- or 6-digit extension, a 7-digit "local" telephone number, a 10-digit long distance telephone number or a multi-digit computer-accessed telephone number. Also, as described in co-pending application Ser. No. 895,001, a directory of names and telephone numbers may be stored in terminal 10. These names and telephone numbers are retrieved and displayed on the display 16 by spelling the names on a letter-by-letter basis, each letter being selected by the actuation of a key on the keypad 24. The operation of the SELECT key indicates the entry of a desired letter.

A DICTATE/PAUSE key is provided which, when actuated, places terminal 10 in a "dictate" or "transcribe" mode for use of dictation/transcription equipment coupled to the terminal. This key also may be operated while a telephone number is being generated or stored in the automatic dialing means included in terminal 10 for the purpose of imparting a "pause" in the dial-out operation, as may sometimes be necessary. For example, in some private branch exchange ("PBX") systems, a "pause" to permit dial tone detection may be necessary in order to complete a dial-out operation.

Function keys 26 also may operate to carry out addition, subtraction, multiplication, and division functions when keypad 24 is operated as a calculator. The mathematical function of each key when operating in this mode is indicated by the markings to the right of the keys in FIG. 2.

The lower function keys 28 include a HOLD key which may operate to place a telephone call "on hold", as is conventional in multi-line, keyset telephone instruments.

Function keys 28 also include a SPEAKER/MUTE key which, when actuated, establishes a "speakerphone" mode of operation of terminal 10. The terminal includes a loud-speaker (112 in FIG. 4) behind a grille 46 and a microphone (110 in FIG. 4), by means of which telephone communication may proceed while handset 14 is in the cradle 18. The function of the SPEAKER/MUTE key is explained in further detail during the description below.

A preferred feature of terminal 10 is the ability to enable the speakerphone speaker to operate when the handset 14 is removed from the cradle 18, while enabling only the handset microphone. This mode is established when the SPEAKER/MUTE key is actuated when handset 14 is off-hook, whereupon the built-in microphone in housing 12, i.e., the speakerphone microphone, is disabled, or muted. During normal speakerphone operation, the actuation of the SPEAKER/MUTE key continues to enable the operation of speaker 46 while muting the operation of the built-in microphone.

Function keys 28 also include a BACK key which, when actuated, causes a backward scrolling of alphanumeric messages displayed on display 16. For example, telephone directory information is included in terminal 10 for use in automatic dialing. Each directory entry may be displayed on display 16, and a user of the terminal may scroll through those entries by operating the BACK key. Also, and as it will be described below, incoming telephone messages can be recorded on a local desk-top dictating machine or "A" unit connected to the transceiver unit 10. As each incoming message is recorded, data relating to that message, such as its length, its time of recording, and its position in a sequence (e.g., the first, second, third, etc. message) is stored in the memory of the unit 10. This data may be displayed on display 16, and the user may scroll through such data by operating the BACK key.

The BACK key may be used to scroll through and display messages received from a computer, such as the computer 112 which is illustrated in application Ser. No. 895,010. The BACK key may also be used to scroll backwards through the menu of soft key display prompts.

Function keys 28 also include a STOP key which, when actuated, terminates whatever routine then is being executed by the microprocessor included in terminal 10. Also included in these function keys is a CALCULATOR/CLEAR key which, when actuated, establishes a calculator mode of operation by which keypad 24 and function keys 26 operate in a manner substantially similar to that of conventional desk-top (or pocket) calculators.

Programmable Keys

User programmable keys 30 and 32 are arranged in two columns, as illustrated. For example, each column includes eight separate keys and, if desired, each key may be programmed to initiate the dialing of a predetermined telephone number or other function when it is pressed. Additional functions may be programmed when the transceiver unit 10 is used in a communications network of the type explained in application Ser. No. 895,010.

Adjacent to the keys 30 and 32 are columns of paper inserts 36 and 38, respectively, on which the user can write information identifying the particular function which has been assigned to the associated key. For example, the identity of a telephone number with which one of these keys is programmed may be written on the corresponding paper insert. As another example, if terminal 10 is used in conjunction with a plurality of telephone lines, selected ones of keys 30 and 32, as desired by the user, may connect the terminal to respective ones of those telephone lines. The identities of the respective telephone lines that have been assigned to those keys may be indicated by appropriate inscription on paper inserts 36, 38.

Preferably, each of programmable keys 30, 32, and 34 is provided with a suitable visual indicator, such as an LED, that is selectively energized when that key is actuated. The LED may be formed as an integral part of the key or, alternatively, a separate LED may be positioned beside or above the key. It will be appreciated, although not mentioned above, that similar LED's may be associated with the preset function keys 28.

As a function that has been programmed for a particular one of programmable keys 30, 32, and 34 changes, the identification of that function can be changed by simply re-writing the associated paper insert.

The following paragraphs discuss some examples of the functions for which the programmable keys can be programmed:

One of the programmable keys can be programmed to connect the transceiver unit 10 to a central dictation system, such as the system 188 shown in FIG. 2 of application Ser. No. 895,010. By operating the key so programmed, the handset 14 is connected to a centrally-located recorder/reproducer over special wiring.

Telephone line selection can be made by programming one or more of the keys 30, 32, or 34 so that terminal 10 is connected to a desired one of several telephone lines by operation of the corresponding key.

Figure 3:
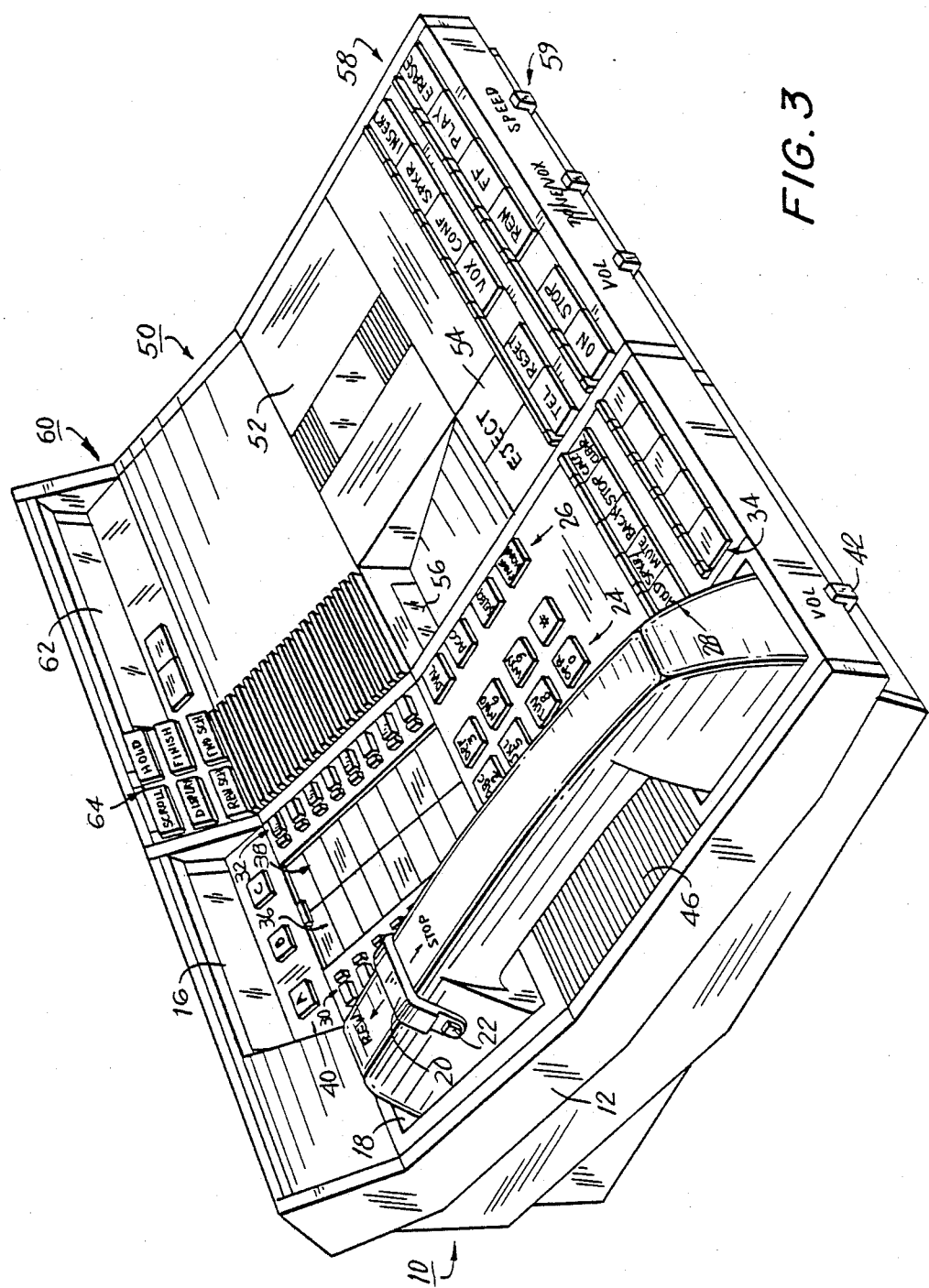
FIG. 3 is a perspective view of the transceiver unit of FIGS. 1 and 2, together with an attached sound recorder/reproducer unit ("A" unit) and display unit ("B" unit)

Telephone message recording is another programmable key function causing an incoming voice message that is received over a selected telephone line to be recorded on the local desk-top dictating machine ("A" unit) connected to terminal 10 (see FIG. 3);

Dial-out inhibiting also can be enabled by a programmable key, whereby the use of keypad 24 or programmable keys 30, 32, and 34 which are programmed with desired telephone numbers may be inhibited, or the number of digits in telephone numbers permitted to be dialed in the unit 10 can be limited. This feature serves as a telephone lock.

Delayed ringing, whereby an audible ringing sound is not generated until a preset number of telephone call ringing signals has been received. For example, if a secretary typically answers an executive's telephone, this delayed ringing feature may be employed on the executive's telephone so that he or she is not disturbed when the telephone rings.

Each programmable key can be programmed to transmit to a personal computer, e.g., the personal computer 112 described in application Ser. No. 895,010, or any other "C" unit, a message of up to 32 characters in length. The message is pre-stored in the personal computer memory by the personal computer operator.

One example of such a message such as: "Please call or see Roger" which could be delivered to any of the other "C" units to tell its user (who is talking on his telephone and thus cannot be reached by that means) to call or see the sender when he finishes his current call.

Another message might be simply "Out of the office", or "In conference - hold all calls" to inform the personal computer operator of the sender's whereabouts or his or her unavailability to answer the telephone. A message such as "cancel previous message" can be programmed in another key and sent to inform the operator that the sender has returned to the office or is now available to take calls.

Such message transmission can greatly increase the efficiency of communications in an office; it saves writing and hand-carrying notes, waiting on the telephone or re-dialing a busy line, etc.

In the usual network, the personal computer operator must enter the pre-programmed messages in the personal computer memory. However, in accordance with an optional feature of the modular units, one of the programmable keys can be programmed to switch the transceiver unit 10 into the voice recognition mode in which a voice recognition circuit, which is "trained" to recognize the user's voice, converts sounds spoken into the microphone of the handset 14 into signals representing words or alphanumeric characters which are displayed on the display 16 and sent to the personal computer. By this means, the user of each transceiver unit 10 can generate unique messages, suited to the needs of the moment, rather than the more limited pre-stored "standard" messages.

The voice recognition mode also can be used to input data to the personal computer to update directories, appointments, and other information stored in the computer.

Although a keyboard could be connected to the transceiver unit 10 to accomplish the same functions, this is not desirable because of the cost of the keyboard, the space it would take in the user's desk, and the relative slowness of that mode of operation due to the fact that the user may not be skilled or practiced in keyboard operation. Therefore, the voice recognition features provide more versatile operation without the use of the hands, except to operate the appropriate programmable key.

The programmable keys also can be programmed to transmit data to the personal computer. For example, changes or additions in a telephone directory, a list of appointments, or the like can be transmitted to the personal computer by this means.

One of the programmable keys can be programmed to perform a locking function to prevent unauthorized use of the unit. When this feature is used, the unit 10 is programmed to display a request for the user to identify himself with a unique identification code which has been stored by the user. Only if the user enters the correct code by use of the keypad 24 is the unit 10 enabled for all operations. If he does not do so, the unit 10 is disabled for every function except receiving telephone calls and setting the limits for lengths of numbers permitted to be dialed on the telephone.

The programmable keys also are capable of being programmed to initiate other functions, such as a momentary telephone line "flash", or a connection of a modem or other peripheral device, such as a video display terminal or printer, to the transceiver unit.

A full list of the functions available for the programmable keys as of this writing appears in application Ser. No. 895,010.

Soft Keys

Referring now to FIGS. 1, 2, and 3, three such "soft" keys 40 are shown. The soft keys 40 are labeled "A", "B", and "C". As it is understood by those of ordinary skill in the art, a "soft" key cooperates with a microprocessor to supply different commands and functions to that microprocessor, depending upon the particular routine which is in the process of being executed. That is, a "soft" key is not dedicated to a particular, predetermined function or command for all routines and for all operating states of the microprocessor. A given soft key, such as key A, may be operated a first time to represent a first command and then, as the microprocessor continues its routine, it may be operated a second time to represent a second, different command. Preferably, soft keys 40 are aligned with display 16 and cooperate with that display and with the microprocessor in the terminal 10 so that the operation of selected ones of these soft keys, as "prompted" by an alphanumeric message displayed on display 16, enables the microprocessor to continue with a particular routine then being executed. The manner in which soft keys 40 are operated to carry out and control the programming of programmable keys 30, 32, and 34 is explained in detail in application Ser. No. 895,017 and will not be repeated here.

General Description of Further Desk-Top Modules

Before describing typical operations which may be carried out by terminal 10, reference is made to FIG. 3 which illustrates the electrical and physical interconnection between terminal 10, a record/playback module ("A" module) 50 and a display module ("B" module) 60.

Record/Playback Module ("A" Module)

Record/playback module 50 comprises a desk-top dictating machine and is adapted to carry out typical dictating functions by which audio messages may be recorded on and reproduced from the record medium. Typically, the record medium comprises a magnetic tape and this tape may be housed in a suitable cassette, such as a standard cassette, a minicassette, a microcassette, or a picocassette of the type described in, for example, U.S. Pat. No. 4,443,827, assigned to the assignee of the present invention. Other record media may be used, such as magnetic disks or magnetic belts. Also contemplated is a solid-state storage device, such as a magnetic bubble array or semiconductor memory chips of the type conventionally used in digital storage devices. For convenience, however, it will be assumed that the record medium is a magnetic tape cassette. Record/playback module 50 may be of the type described in co-pending application Ser. No. 895,006, the disclosure of which hereby is incorporated herein by reference.

Record/playback module 50 is adapted to record audio messages which are produced by the use of transceiver unit 10. Such audio messages may be dictated by a user via handset 14 or may be received by the terminal over one or more telephone lines. The "A" module 50 thus is capable of cooperating with transceiver unit 10 to function as a telephone answering machine, to record telephone-transmitted dictation from a remote location or to record a telephone conversation, as will be described in greater detail below.

Still referring to FIG. 3, record/playback module 50 includes a cassette compartment (not shown) protected by a door 52 which, when opened, provides access to that compartment for the loading and unloading of a magnetic tape cassette. An eject button 54 is provided by which a loaded cassette is ejected from the module, resulting in the opening of door 52 and facilitating the removal of that cassette from the cassette compartment.

The "A" module 50 also is provided with a display 56 which, typically, provides an indication of the relative position of the recording tape as it is transported during record and playback modes of operation. As an example, display 56 provides a visual indication of a simple 4-digit tape count or, alternatively, a 4-digit time- or date-related representation such as 5.0 minutes, 10.3 minutes, etc.

The record/playback module also is provided with various pushbuttons 58 which, when actuated, effect the operations generally designated on those pushbuttons. For example, an ON button is adapted to actuate module 50 to its active mode, so that dictating operations can be carried out.

Telephone Call Recording

A TELEPHONE button enables record/playback module to record telephone calls which are received or made by transceiver unit 10. As will be described below, when the terminal 10 is conditioned to record incoming telephone calls, the TELEPHONE button on module 50 should be actuated. A RESET button functions to reset display 56 to a preset indication, such as "0000". This RESET button also may be actuated to reset the display provided on display 62 (to be described) of display module 60. A STOP button included in pushbuttons 58 establishes a quiescent mode of operation for module 50. Typically, the STOP button is actuated to terminate a fast-forward, rewind, playback, or record mode of operation.

A VOX button, when actuated, enables record/playback module 50 to record audio messages so long as a speech signal is present. That is, recording tape is advanced in the presence of such speech signals and is stopped when those speech signals terminate. Such voice-operated recording is well known to those of ordinary skill in the art.

A CONFERENCE button establishes a "conference" mode of recording whereby the amplification of audio signals recorded on the magnetic tape is increased. Preferably, the CONFERENCE button is used in conjunction with a conference microphone (not shown) which, when connected to module 50, permits the recording of a conference among individuals. A SPEAKER button enables the activation of an internal speaker (not shown) provided in module 50. When audio messages recorded on the magnetic tape are played back, such messages are reproduced by that internal speaker. Usually, when handset 14 is used to record dictation, the internal speaker of module 50 is not used.

An INSERT button is adapted, when actuated, to establish an "insert" mode of operation whereby audio information is recorded onto a separate channel, or track, of the magnetic tape. This feature enables a user to dictate additional material without editing the message which has already been recorded.

A REWIND button, when actuated, rewinds the magnetic tape at a relatively high speed until, for example, the beginning of the tape is reached or the STOP button is actuated. Conversely, a FAST FORWARD button serves to advance the magnetic tape at a relatively high speed. A PLAY button, when actuated, advances the magnetic tape at its normal speed, whereby audio messages recorded thereon are played back. Such played back messages may be reproduced by the internal speaker of record/playback module 50. An ERASE button is adapted to be actuated concurrently with either the REWIND button or the FAST FORWARD button so as to establish an "erase" mode. An electromagnetic erase circuit (not shown) is triggered to erase audio information which may have been recorded previously on the magnetic tape.

Display Module ("B" Module)

Display module 60 (the "B" module) is described in greater detail in co-pending application Ser. No. 894,993 and also in co-pending application Ser. No. 895,011, the disclosures of which are incorporated herein by reference. This display module includes a display 62 which provides both graphical and digital displays. As described in the aforementioned co-pending applications, the graphical displays provide visual information regarding the type and length of each recorded message and also provide displays indicative of the locations of recorded instructions and "special" notes. In addition, a cursor display is provided to indicate the present position of the magnetic tape as it is transported during various dictate operations. The digital display indicates the total length of dictation in minutes and tenths of minutes as such dictation is recorded. Other information also is provided by the digital display during transcribe operations, such additional displays forming no part of the present invention.

Display module 60 also is provided with display control buttons 64. The functions carried out by the individual control buttons are represented by the legends provided on each such button. The SCROLL button, when actuated, permits a user to "scroll" through the various types of messages that may be recorded, such as letters, "priority" letters, instructions or "special" notes. One of these types of messages may be selected for rapid access, as described more particularly in the aforementioned co-pending applications.

A DISPLAY control button may be selectively actuated to scan a dictated magnetic tape for the purpose of detecting information recorded thereon representing the various types, lengths, and locations of messages. This information is used to control display 62 to provide the aforementioned graphical display which is most helpful in preparing for transcription of dictated information. A REWIND SEARCH control button, when actuated, causes the magnetic tape to rewind in order to access a selected type of message. Message selection is made by the operation of the SCROLL button, as mentioned above.

Display control buttons 64 also include a HOLD button which, essentially, "freezes" the information displayed on display 62 such that if a new magnetic tape is loaded into record/playback module 50, messages may be dictated on that new tape without disturbing the display associated with the previous tape. This permits dictation to be resumed on the previous tape without any confusion or ambiguity in the display.

A FINISH control button functions to record a "summary" block of data representing the types, locations and lengths of all messages recorded on a particular magnetic tape. This data, when read prior to transcription, presets display 62 to indicate the types and locations of messages which need transcription. Operation of the FINISH button during a transcribe mode serves to extinguish the display of the message which has just been transcribed.

A FORWARD SEARCH control button serves to advance the magnetic tape at a rapid rate to access a selected type of message. It is appreciated that this contro button operates in a manner similar to that of the REWIND SEARCH control button.

Transceiver Unit ("C" Unit) Circuitry

Figure 4:
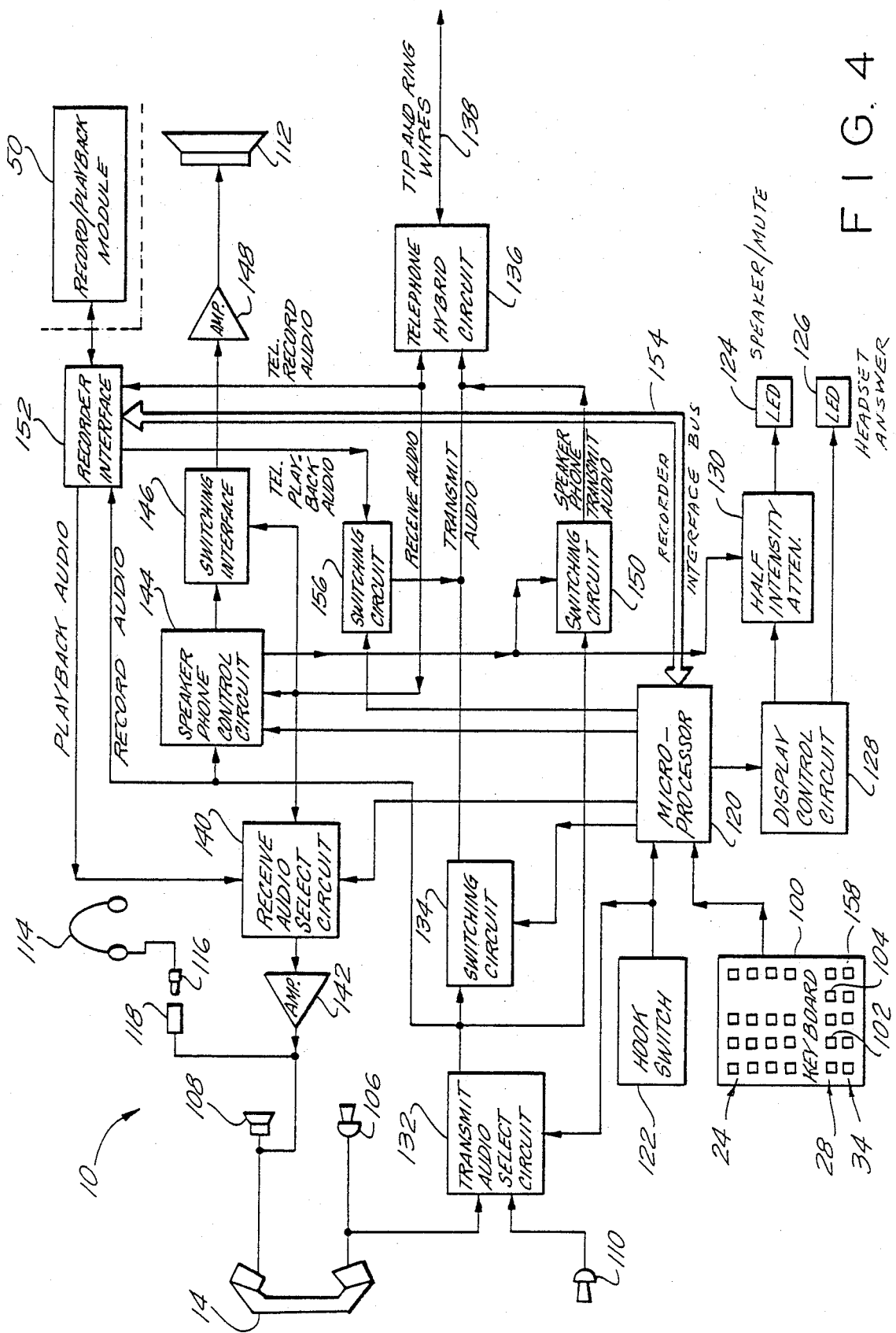
FIG. 4 is a schematic block diagram showing internal circuitry of a transceiver unit ("C" unit) used in the present invention.

FIG. 4 depicts, in block diagram form, circuitry for the transceiver unit 10. Furthermore, FIG. 4 shows the transceiver unit 10 connected to the record/playback module 50. As indicated previously, the transceiver unit 10 includes a handset 14 and a keyboard 100, which has the conventional pushbutton telephone keypad 24, preset function keys 28, and user-programmable keys 34. As mentioned above, the preset function keys include a SPEAKER/MUTE key, which is denoted by the reference numeral 102, and a STOP key, which is denoted by the reference numeral 104.

The handset 14 has a microphone 106 and a speaker 108. In order to utilize the speakerphone feature of the transceiver unit 10, this unit includes a microphone 110 and a speaker 112. The speaker 112 is mounted behind the grille in the housing for the transceiver unit 10. If desired, a headset 114 may be connected to the transceiver unit 10 through a jack 116, which is inserted into a plug 118 is located in the housing for the transceiver unit 10. The headset 114 is similar to conventional headsets and includes a speaker for each ear.

The operation of the transceiver unit 10 is controlled by a microprocessor 120. The microprocessor 120 receives input signals from the keyboard 100 and a hook switch 122. The microprocessor 120 controls several switching circuits, as is described in greater detail below. The microprocessor 120 controls, i.e., turns on and off, LEDs 124 and 126 through a display control circuit 128. (Other LEDs are provided and explained above.) The LED 124 is associated with and adjacent to the SPEAKER/MUTE key 102. The intensity of the LED 124 is varied depending upon which mode the transceiver unit 10 is in, as explained in greater detail below. A half intensity attenuator 130 is employed to change the intensity of the LED 124.

As used herein, the idle mode signifies the condition in which the handset 14 is in the cradle and the speakerphone feature is not being used. In other words, the telephone line associated with the transceiver unit 10 is not seized.

The user initiates a handset telephone mode by removing the handset 14 from the cradle. In this handset telephone mode, the handset microphone 106 and the handset speaker 108 are enabled, while the speakerphone microphone 110 and the speakerphone speaker 112 are disabled. The hook switch 122 detects the change from the on-hook condition to the off-hook condition and sends a signal to the transmit audio select circuit 132 accordingly. The transmit audio select circuit 132 selects the handset microphone 106 rather than the speakerphone microphone 110. The hook switch 122 also sends a signal indicative of the change to the microprocessor 120, and the microprocessor 120 appropriately controls a switching circuit 134 to permit the audio signals from the microphone 106 to travel to a telephone hybrid circuit 136. The output signals from the switching circuit 134 is referred to as the transmit audio signals. The telephone hybrid circuit then delivers the transmit audio signals to conventional tip and ring wires 138. The telephone hybrid circuit 136 is explained in greater detail below.

Incoming signals, e.g., the voice signals from the other party to the telephone conversation, enter the transceiver unit 10 over the tip and ring wires 138. The telephone hybrid circuit 136 then directs these signals to a receive audio select circuit 140. The microprocessor 120 sends a suitable control signal to the receive audio select circuit 140 to permit the receive audio signals to be supplied to an amplifier 142. From the amplifier 142, the receive audio signals travel to the speaker 108 in the handset 14.

During a normal telephone call, transmit audio signals and receive audio signals are simultaneously present on the tip and ring wires 138. The telephone hybrid circuit 136 operates to separate the receive audio signals from the transmit audio signals on the tip and ring wires 138. Specifically, the telephone hybrid circuit 136 subtracts the transmit audio signals from the signals on the tip and ring wires and, thereby, produces the receive audio signals. The telephone hybrid circuit 136 operates in a manner known to persons having ordinary skill in the art.

If the transceiver unit 10 is in the handset telephone mode, the user may enter a monitor mode by operating the SPEAKER/MUTE key 102. In this monitor mode, the handset microphone 106, the handset speaker 108, and the speakerphone speaker 112 are enabled, while the speakerphone microphone 110 is disabled. In other words, by pressing the SPEAKER/MUTE key 102, the user enables the speakerphone speaker 112 to institute the monitor mode. The user speaks into the microphone 106 and listens to the speaker 108, while others in the room may listen to the other party to the telephone conversation through the speaker 112.

The microprocessor detects the operation of the SPEAKER/MUTE key 102, and it sends a signal to a speakerphone control circuit 144. The telephone hybrid circuit 136 delivers the receive audio signals to the speakerphone control circuit 144 and to a switching circuit 146. The signal from the microprocessor 120 indicates to the speakerphone control circuit 144 that the speakerphone control circuit 144 should enable the speaker 112 when receive audio signals are present. Accordingly, the speakerphone control circuit 144 detects the presence of the receive audio signals and sends a control signal to the switching circuit 146. The switching circuit 146 then delivers the receive audio signals to an amplifier 148. From the amplifier 148, the receive audio signals travel to the speaker 112. In addition, the microprocessor 120 suitably controls the receive audio select circuit 140 to cause it to send the receive audio signals to the amplifier 42 and to the speaker 108.

When the transceiver unit 10 is in the monitor mode, the user may initiate an off-hook mute mode by operating the SPEAKER/MUTE key 102. In the off-hook mute mode, the handset microphone 106 is disabled, but the handset speaker 108 and the speakerphone speaker 112 remain enabled. Hence, the user as well as others in the room may talk freely while listening to the other party to the telephone call.

When the transceiver unit 10 is in the monitor mode, the microprocessor 120 detects the operation of the SPEAKER/MUTE key 102 and sends a suitable control signal to the switching circuit 134. The switching circuit 134 then prevents audio signals from traveling from the microphone 106 to the telephone hybrid circuit 136.

When the transceiver unit 10 is in the off-hook mute mode, the user may return to the monitor mode by again operating the SPEAKER/MUTE key 102. The microprocessor 120 detects the operation of the SPEA- KER/MUTE key 102, and sends a suitable control signal to the switching circuit 134. The switching circuit 134 then permits audio signals from the microphone 106 to travel to the telephone hybrid circuit 136.

When the transceiver unit 10 is in the off-hook mute mode, the user may return to the handset telephone mode by operating the STOP key 104. The microprocessor 120 detects the operation of the STOP key 104 and sends a suitable control signal to the switching circuit 134 and the speakerphone control circuit 144. The switching circuit 134 then permits audio signals from the microphone 106 to travel to the telephone hybrid circuit 136. Furthermore, the speakerphone control circuit 144 appropriately controls the switching circuit 146 to prevent the receive audio signals from reaching the amplifier 148 and the speaker 112.

When the transceiver unit 10 is in the idle mode, the user may institute the speakerphone mode by operating the SPEAKER/MUTE key 102. In the speakerphone mode, the handset 14 is in the cradle, i.e. which is an on-hook condition. In the speakerphone mode, the speakerphone microphone 110 and the speakerphone speaker 112 are enabled, while the handset microphone 106 and the handset speaker are disabled. The on-hook condition of the handset is detected by the hook switch 122, which sends a signal to the transmits audio select circuit 132. The transmit audio select circuit 132 then selects the speakerphone microphone 110 rather than the handset microphone 106. The hook switch 122 also delivers a signal indicative of the on-hook condition to the microprocessor 120. The microprocessor 120 detects the operation of the SPEAKER/MUTE key 102, and, in response it provides an appropriate control signal to the speakerphone control circuit 144.

The speakerphone control circuit 144 operates to establish a priority for the transmit and receive audio signals. That is, the speakerphone control circuit 144 controls, during the speakerphone mode, whether audio signals from the microphone 110 reach the telephone hybrid circuit 136 or whether receive audio signals from the telephone hybrid circuit 136 reach the speaker 112. In particular, if receive audio signals are initially present, the speakerphone control circuit 144 selects the receive audio signals over the transmit audio signals while both signals are present and for 0.5 seconds after the receive audio signals are absent. In addition, if the transmit audio signals are initially present, the transmit audio signals are selected over the receive audio signals while both signals are present. If both the transmit audio signals and the receive audio signals are absent for more than 0.5 seconds, the speakerphone control circuit 144 selects the lines that allow the transmit audio signals to reach the telephone hybrid circuit 136.

To accomplish the functions described above, the speakerphone control circuit 144 detects whether any signals are present at the output of the transmit audio select circuit 132. In addition, the speakerphone control circuit 144 detects whether any receive audio signals are present at the output of the telephone hybrid circuit 136. When transmit audio signals are selected over receive audio signals, the speakerphone control circuit 144 sends an appropriate signal to a switching circuit 150. The switching circuit 150 then allows the signals at its input to reach its output. The output signals from the switching circuit 150 are referred to as the speakerphone transmit audio signals, and these audio signals are delivered to the telephone hybrid circuit 136. Thus, audio signals from the microphone 110 travel through the transmit audio select circuit 132 and the switching circuit 150 to the telephone hybrid circuit 136 under the control of the speakerphone control circuit 144.

If the speakerphone contol circuit 144 selects receive audio signals over transmit audio signals, the speakerphone control circuit 144 provides a suitable control signal to the switching circuit 146, which then permits the receive audio signals to travel from the telephone hybrid circuit 136 to the amplifier 148 and the speaker 112.

When the transceiver unit 10 is in the speakerphone mode, the user may initiate an on-hook mute mode by operating the SPEAKER/MUTE key 102. In this on-hook mute mode, the speakerphone microphone 110 is disabled, while the speakerphone speaker 112 remains enabled. The handset microphone 106 and the handset speaker 108 are still disabled. The on-hook mute mode is similar to the off-hook mute mode, except that the microphone 110 is temporarily disabled instead of the microphone 106.

The microprocessor 120 detects the operation of the SPEAKER/MUTE key 102 delivers a suitable control signal to the speakerphone control circuit 144. The speakerphone control circuit 144, in turn, supplies a signal which causes the switching circuit 150 to prevent audio signals from the microphone 110 from reaching the telephone hybrid circuit 136.

When the transceiver unit 10 is in the on-hook mute mode, the user may return to the speakerphone mode by operating the SPEAKER/MUTE key 102. The microprocessor detects the operation of the SPEAKER/MUTE key 102 and sends an appropriate control signal to the speakerphone control circuit 144. The speakerphone control circuit 144 then supplies a signal to the switching circuit 150 which causes the switching circuit 150 to permit signals from the microphone 110 to travel to the telephone hybrid circuit 136.

When the transceiver unit 10 is in the on-hook mute mode, the user may return to the idle mode by pressing the STOP key 104. Alternatively, when the transceiver unit 10 is in the on-hook mute mode, the user may initiate the handset telephone mode by removing the handset 14 from the cradle.

The LED 124 associated with the SPEAKER/MUTE key 102 is energized during the speakerphone mode and during the monitor mode. The LED 124 is energized at full intensity when the speakerphone control circuit 144 selects receive audio signals over transmit audio signals The LED 124 is energized at half intensity when the speakerphone control circuit 144 selects transmit audio signals over receive audio signals. To accomplish this reduction in intensity, the speakerphone control circuit 144 delivers a suitable control signal to the half intensity attenuator 130. The control signal for the half intensity attenuator 130 is the same as the control signal for the switching circuit 150. Therefore, the LED 124 is energized a half intensity when the speakerphone control circuit 144 enables the transmit audio signals, as explained above. The microprocessor 120 controls the LED 124, through the display control circuit 128, to cause the LED 124 to blink during the on-hook mute mode and during the off-hook mute mode. The LED 124 blinks on at full intensity inasmuch as transmit audio and speakerphone transmit audio signals are disabled during the off-hook mute mode and the on-hook mute mode, respectively.

As noted previously, the transceiver unit 10 may be used with a record/playback module 50. The transceiver unit 10 includes a recorder interface 152, which facilitates the connection of the record/playback module 50. The microprocessor 120 communicates with and controls the recorder interface 152 through a recorder interface bus 154.

During the playback mode of the module 50, playback audio signals are sent from the module 50 through the recorder interface to the receive audio select circuit 140. The microprocessor 120 controls the receive audio select circuit 140 to permit the playback audio signals to travel through the amplifier 142 to the speaker 108 or to the headset 114, if it is connected. During the record mode of the module 50, record audio signals travel from the microphone 106 through the transmit audio select circuit 132 to the recorder interface 12 and then to the module 50, where they are recorded.

As shown in FIG. 4, the transceiver unit 10 is connected between the record/playback module 50 and the conventional telephone line 138. Consequently, record audio signals from the telephone line 138 pass through the transceiver unit 10 before reaching the module 50. Similarly, playback audio signals from the module 50 pass through the transceiver unit 10 before reaching the telephone line 138. The microprocessor 120 controls the recorder interface 152 through the recorder interface bus 154 to control the telephone record audio signals and the telephone playback audio signals. If the module 50 is employed to provide playback signals to the telephone line 138, the microprocessor 120 supplies a suitable control signal to the recorder interface 152 through the recorder interface bus 154. Moreover, the microprocessor 120 provides a suitable control signal to a switching circuit 156. When the switching circuit 156 receives the control signal from the microprocessor 120, the switching circuit 156 permits the telephone playback audio signals to travel from the recorder interface 152 to the telephone hybrid circuit 136. If the module 50 is being used to record audio signals from the telephone line 138, the microprocessor 120 sends a suitable control signal to the recorder interface 152 over the recorder interface bus 154. In response to the control signal from the microprocessor 120, the recorder interface 152 switches the telephone record audio signals to the module 50, where they are recorded.

One of the user-programmable keys 34 may be programmed to provide a headset answer feature, which, when actuated, directs incoming audio signals to the headset 114 rather than the handset 14. This feature enables a transcriptionist to answer the telephone using the speakerphone microphone, without removing the headset.

Specifically, a key 158 may be programmed to provide the headset answer feature by previously programming this key for this feature by sequentially pressing the keys #, *, 1, 1, on the keypad 24 in this order and then by pressing the key 158. This key programming sequence together with other key programming sequences are explained in further detail in application Ser. No. 895,010. Once the key 158 has been programmed with the headset answer feature, it may be successively operated to enable and disable the headset answer feature. If the headset answer feature is not actuated, the transceiver unit 10 operates as explained above. If, however, the headset answer feature is actuated, the transceiver unit 10 operates in a manner similar to, but somewhat different from, that described above. The differences will be explained below.

Assuming that the headset answer feature has been instituted, as indicated when the LED 126 is energized, the transceiver unit 110 is initially in an idle mode. The telephone line 138 is not seized, and no microphone or speaker is enabled. From the idle mode, the user may enter a hands-free mode by operating the SPEAKER/MUTE key 102. In the hands-free mode, the speakers in the headset 114 are enabled, as is the speakerphone microphone 110. The hands-free mode is similar to the speakerphone mode described above, except that the headset speakers are enabled rather than the speakerphone speaker 112. Hence, a transcriptionist may answer a ringing telephone and converse with the caller without removing the headset 114 by pressing the key 158 followed by the SPEAKER/MUTE key 102, or just by pressing the SPEAKER/MUTE key 102 if the key 158 has already been enabled.

The microprocessor 120 detects the operation of the SPEAKER/MUTE key 102. The microprocessor 120 checks the state of the hook switch 122 and the key 158. The microprocessor appropriately conrols the receive audio select circuit 140 to permit receive audio signals to travel from the telephone hybrid circuit 136 through the amplifier 142 to the headset 114.

In the hands-free mode, the handset 14 is in the cradle, which is an on-hook condition. Consequently, the transmit audio select circuit 132 selects the speakerphone microphone 110 instead of the handset microphone 106. The microprocessor 120 sends a suitable control signal to the speakerphone control circuit 144. The speakerphone control circuit 144, in turn, sends a control signal to the switching circuit 150, which permits the audio signals from the microphone 110 to travel to the telephone hybrid circuit 136. In the hands-free mode, the speakerphone control circuit 144 maintains the priority for the receive and transmit audio signals that is explained above.

When the transceiver unit 10 is in the hands-free mode, the user may initiate an on-hook mute mode by operating the SPEAKER/MUTE key 102. In this on-hook mute mode, the speaker 110 is disabled, while the headset 114 remains enabled. The user may return from this on-hook mute mode to the hands-free mode by again operating the SPEAKER/MUTE key 102.

If the headset answer feature is actuated and the handset 114 is removed from the cradle, a handset telephone mode is initiated. This handset telephone mode is no different than the handset telephone mode when the headset answer feature is not actuated.

When the transceiver unit 10 is in the handset telephone mode, the user may initiate a monitor mode by operating the SPEAKER/MUTE key 102. In this monitor mode, the handset microphone 106, the handset speaker 108, and the speakerphone speaker 112 are enabled, while the speakerphone microphone 110 is disabled. The user may enter and leave an off-hook mute mode successively operating the SPEAKER/MUTE key 102. In this off-hook mute mode, the handset microphone 106 is disabled, while the handset speaker 108 and the speakerphone speaker 112 remain enabled.

When the transceiver unit 10 is in the monitor mode associated with the headset answer feature, the user may initiate the hands-free mode by returning the handset 14 to the cradle, thereby changing from an off-hook condition to an on-hook condition. In response to this change, the microprocessor 120 disables the handset microphone 106, the handset speaker 108, and the speakerphone speaker 112, and it enables the speakerphone microphone 110 and the headset 114.

Flowcharts

Figure 5:
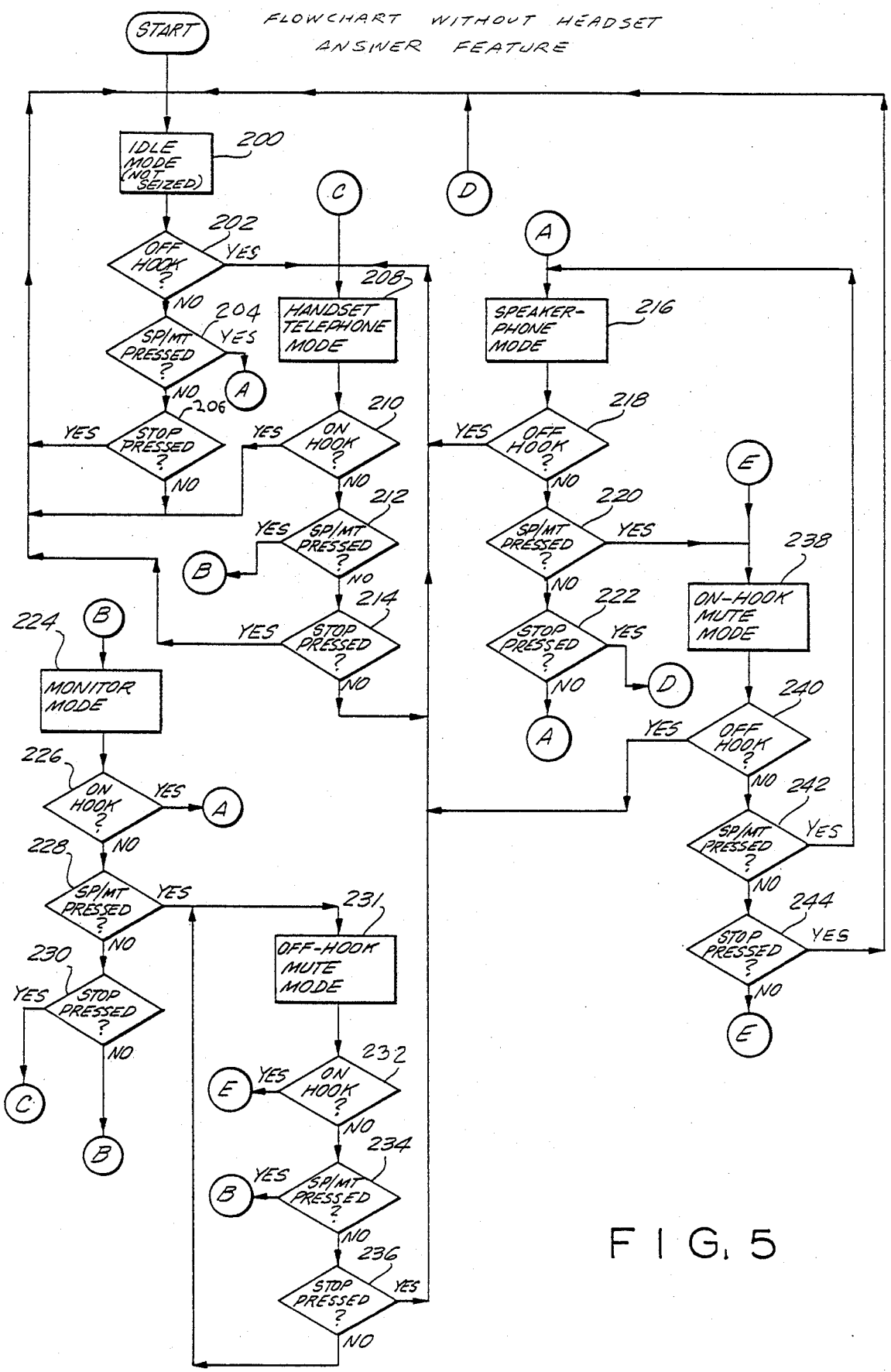
FIG. 5 is a flowchart illustrating a routine for a transceiver unit as shown in FIGS. 1-4.
Figure 6:
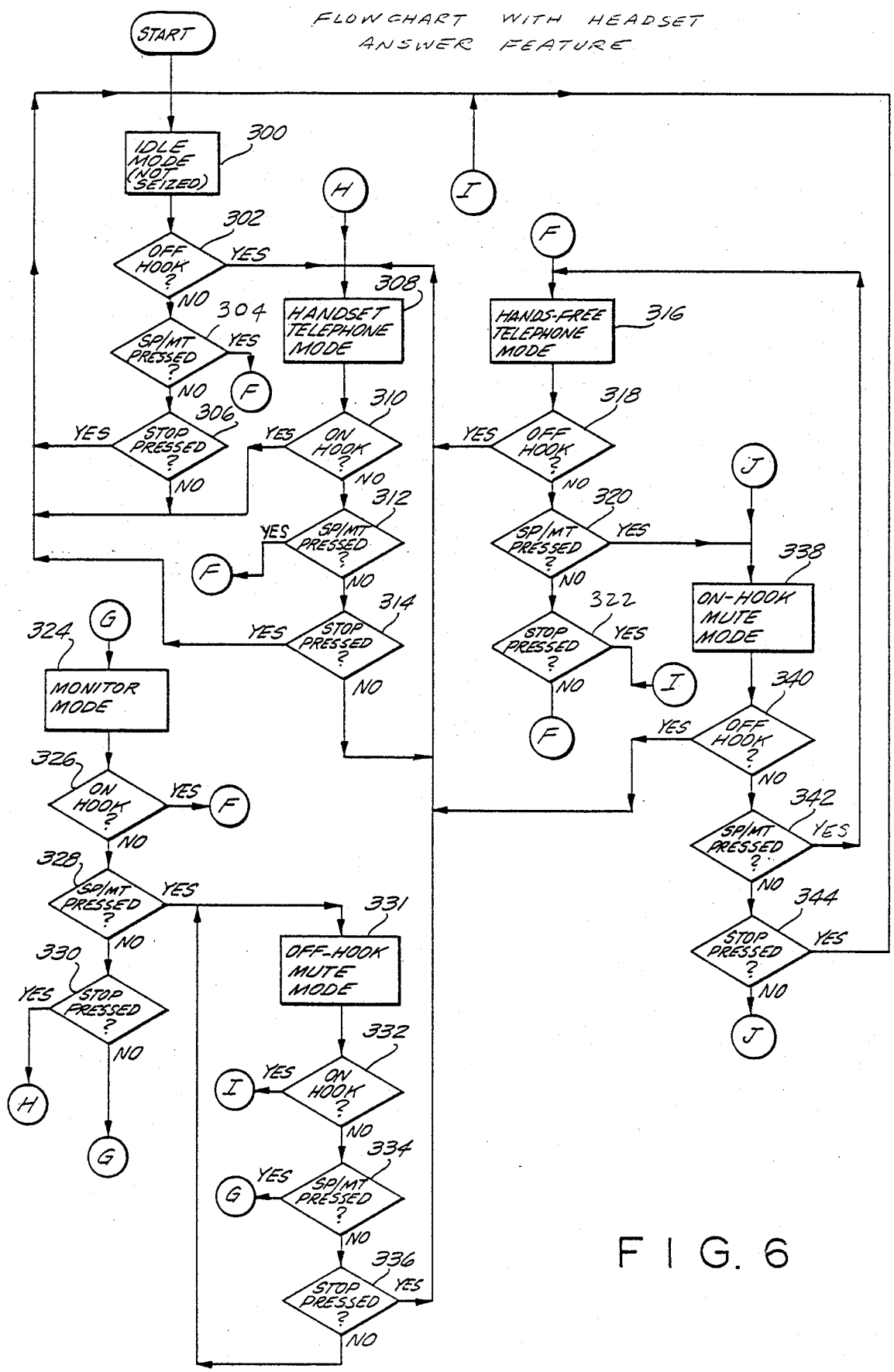
FIG. 6 is another flowchart illustrating another routine for a transceiver unit as shown in FIGS. 1-4.

FIGS. 5 and 6 are flowcharts illustrating programming for the transceiver unit 10. FIG. 5 is a flowchart of the routine followed when the headset answer feature is not initiated, while FIG. 6 is a flowchart of the routine followed when the headset answer feature is initiated.

At the start of the routine shown in FIG. 5, the transceiver unit is in the idle mode, as indicated at 200. The routine then checks at 202 whether the handset has been removed from the cradle. If so, the routine causes the transceiver unit to go into the handset telephone mode, as shown at 208. If the handset has not been removed from the cradle, the routine determines at 204 whether the SPEAKER/MUTE key has been pressed. If so, the routine initiates the speakerphone mode, as depicted by 216. If the SPEAKER/MUTE key has not been pressed, the routine ascertains at 206 whether the STOP key has been pressed. If so, the routine maintains the idle mode, as denoted by 200. If the STOP key has not been pressed, the routine maintains the idle mode, as indicated at 200.

When the transceiver unit is in the handset telephone mode, as illustrated at 208, the routine inquires at 210 whether the handset has been returned to the cradle. If so, the routine initiates the idle mode, as indicated at 200 If the handset has not been returned to the cradle, the routine determines at 212 whether the SPEAKER/MUTE key has been pressed. If so, the routine initiates the monitor mode, as shown at 224. If the SPEAKER/MUTE key has not been pressed, the routine ascertains at 214 whether the STOP key has been pressed. If so, the routine returns to the idle mode, as indicated at 200. If the STOP key has not been pressed, the routine continues on in the handset telephone mode, as depicted by 208.

The monitor mode is denoted by 224. This mode may be entered from the handset telephone mode when the SPEAKER/MUTE key is pressed, as shown at 212. When the transceiver unit is in the monitor mode, the routine inquires whether the handset has been returned to the cradle. If so, the routine initiates the speakerphone mode, as illustrated at 216. If the handset has not been returned to the cradle, the routine determines at 228 whether the SPEAKER/MUTE key has been pressed. If so, the routine initiates an off-hook mute mode, as designated by 231. If the SPEAKER/MUTE key has not been pressed, the routine ascertains at 230 whether the STOP key has been pressed. If so, the routine initiates the handset telephone mode, as shown at 208. If the STOP key has not been pressed, the routine stays in the monitor mode, as denoted by 224.

The routine causes the transceiver unit to change from the monitor mode, as denoted by 224, to the off-hook mute mode, as designated by 231, in response to the operation of the SPEAKER/MUTE key, as illustrated at 228. During the off-hook mute mode, the routine inquires at 232 whether the handset has been returned to the cradle. If so, the routine initiates an on-hook mute mode, as depicted by 238. If the handset has not been returned to the cradle, the routine determines at 234 whether the SPEAKER/MUTE key has been pressed. If so, the routine returns to the monitor mode, as denoted by 224. If the SPEAKER/MUTE key has not been pressed, the routine ascertains at 236 whether the STOP key has been pressed. If so, the routine returns to the handset telephone mode, as indicated at 208. If.the STOP key has not been pressed, the routine maintains the off-hook mute mode, as designated by 231.

As mentioned above, the speakerphone mode, as shown at 216, is initiated from the idle mode, as indicated at 200, in response to the operation of the SPEAKER/MUTE key, as illustrated at 204. When the transceiver unit is in the speakerphone mode, the routine inquires at 218 whether the handset has been removed from the cradle. If so, the routine initiates the handset telephone mode, as depicted by 208. If the handset has not been removed from the cradle, the routine determines at 220 whether the SPEAKER/MUTE key has been pressed. If so, the routine initiates an on-hook mute mode, as denoted by 238. If the SPEAKER/MUTE key has not been pressed, the routine ascertains at 222 whether the STOP key has been pressed. If so, the routine returns to the idle mode, as indicated at 200. If the STOP key has not been pressed, the routine maintains the speakerphone mode, as shown at 216.

The on-hook mute mode, as denoted by 238, may be entered from the speakerphone mode, as shown at 216, when the SPEAKER/MUTE key is pressed, as designated by 220. Alternatively, the on-hook mute mode, as denoted 238, may be entered from the off-hook mute mode, as illustrated at 231, when the handset is placed back in the cradle. When the transceiver unit is in the on-hook mute mode, the routine inquires at 240 whether the handset has been removed from the cradle. If so, the routine initiates the handset telephone mode, as depicted by 208. If the handset has not been removed from the cradle, the routine determines at 242 whether the SPEAKER/MUTE key has been pressed. If so, the routine initiates the speakerphone mode, as shown at 216. If the SPEAKER/MUTE key has not been pressed, the routine ascertains at 242 whether the STOP key has been pressed. If so, the routine returns to the idle mode, as indicated at 200. If the STOP key has not been pressed, the routine maintains the on-hook mute mode, as denoted by 238.

At the start of the routine shown in FIG. 6, the transceiver unit is in the idle mode, as indicated at 300. The routine then checks at 302 whether the handset has been removed from the cradle. If so, the routine causes the transceiver unit to go into the handset telephone mode, as shown at 308. If the handset has not been removed from the cradle, the routine determines at 304 whether the SPEAKER/MUTE key has been pressed. If so, the routine initiates the hands-free mode, as depicted by 316. If the SPEAKER/MUTE key has not been pressed, the routine ascertains at 306 whether the STOP key has been pressed. If so, the routine maintains the idle mode, as denoted by 300. If the STOP key has not been pressed, the routine maintains the idle mode, as indicated at 300.

When the transceiver unit is in the handset telephone mode, as illustrated at 308, the routine inquires at 310 whether the handset has been returned to the cradle. If so, the routine initiates the idle mode, as indicated at 300. If the handset has not been returned to the cradle, the routine determines at 312 whether the SPEAKER/MUTE key has been pressed. If so, the routine initiates the monitor mode, as shown at 324. If the SPEAKER/MUTE key has not been pressed, the routine ascertains at 314 whether the STOP key has been pressed. If so, the routine returns to the idle mode, as indicated at 300. If the STOP key has not been pressed, the routine continues on in the handset telephone mode, as depicted by 308.

The monitor mode is denoted by 324. This mode may be entered from the handset telephone mode when the SPEAKER/MUTE key is pressed, as shown at 312. When the transceiver unit is in the monitor mode, the routine inquires at 326 whether the handset has been returned to the cradle. If so, the routine initiates the hands-free mode, as illustrated at 316. If the handset has not been returned to the cradle, the routine determines at 328 whether the SPEAKER/MUTE key has been pressed. If so, the routine initiates an off-hook mute mode, as designated by 331. If the SPEAKER/MUTE key has not been pressed, the routine ascertains at 330 whether the STOP key has been pressed. If so, the routine initiates the handset telephone mode, as shown at 308. If the STOP key has not been pressed, the routine stays in the monitor mode, as denoted by 324.

The routine causes the transceiver unit to change from the monitor mode, as denoted by 324, to the off-hook mute mode as designated by 331, in response to the operation of the SPEAKER/MUTE key, as illustrated at 328. During the off-hook mute mode, the routine inquires at 332 whether the handset has been returned to the cradle. If so, the routine initiates an on-hook mute mode, as depicted by 338. If the handset has not been returned to the cradle, the routine determines at 334 whether the SPEAKER/MUTE key has been pressed. If so, the routine returns to the monitor mode, as denoted by 324. If the SPEAKER/MUTE key has not been pressed, the routine ascertains at 326 whether the STOP key has been pressed. If so, the routine returns to the handset telephone mode, as indicated at 308. If the STOP key has not been pressed, the routine maintains the off-hook mute mode, as designated by 331.

As mentioned above, the hands-free mode, as shown at 316, is initiated from the idle mode, as indicated at 300, in response to the operation of the SPEAKER/MUTE key, as illustrated at 304. When the transceiver unit is in the hands-free mode, the routine inquires at 318 whether the handset has been removed from the cradle. If so, the routine initiates the handset telephone mode, as depicted by 308. If the handset has not been removed from the cradle, the routine determines at 320 whether the SPEAKER/MUTE Key has been pressed. If so, the routine initiates an on-hook mute mode, as denoted by 338. If the SPEAKER/MUTE key has not been pressed, the routine ascertains at 322 whether the STOP key has been pressed. If so, the routine returns to the idle mode, as indicated at 300. If the STOP key has not been pressed, the routine maintains the hands-free mode, as shown at 316.

The on-hook mute mode as denoted by 338, may be entered from the hands-free mode, as shown at 316, when the SPEAKER/MUTE key is pressed, as designated by 320. Alternatively, the on-hook mute mode, as denoted by 338, may be entered from the off-hook mute mode, as illustrated at 331, when the handset is placed back in the cradle. When the transceiver unit is in the on-hook mute mode, the routine inquires at 340 whether the handset has been removed from the cradle. If so, the routine initiates the handset telephone mode, as depicted by 308. If the handset has not been removed from the cradle, the routine determines at 342 whether the SPEAKER/MUTE key has been pressed. If so, the routine initiates the hands-free mode, as shown at 316. If the SPEAKER/MUTE key has not been pressed, the routine ascertains at 342 whether the STOP key has been pressed. If so, the routine returns to the idle mode, as indicated at 300. If the STOP key has not been pressed, the routine maintains the on-hook mute mode, as denoted by 338.

Although not illustrated in FIGS. 5 and 6, the key 158 may be pressed to institute the headset answer feature from the modes other than the idle mode. For instance, the key 158 may be pushed when the transceiver unit is in the monitor mode without the headset answer feature to initiate the headset answer feature. This operation places the transceiver unit in the monitor mode with the headset answer feature. However, the control signals for the headset microphone and speaker and for the speakerphone microphone and speaker are the same in both monitor modes. Accordingly, the microprocessor simply notes the change in state of the key 158. Similarly, the handset telephone mode without the headset answer feature employs the same microphone and speaker connections as the handset telephone mode with the headset answer feature, and the off-hook mute mode without the headset answer feature uses the same microphone and speaker connections as the off-hook mute mode with the headset answer feature. The user switches between these modes just by operating the key 158 without changing the microphone and speaker connections. The programming steps necessary for effecting these operations are, based upon the preceding description, readily apparent to a person having ordinary skill in the art.

Although particular illustrative embodiments of the invention have been described herein with reference to the accompanying drawings, the invention is not limited to these particular embodiments. Various changes and modifications may be made thereto by those skilled in the art without departing from the spirit or scope of the invention, which is defined by the appended claims.

What is claimed is:

1. Telephone apparatus for transmitting and receiving audio signals, comprising:
   a handset having a first microphone and a first speaker;
   speakerphone means having a second microphone and a second speaker;
   hook switch means for detecting an on-hook condition of the handset and for detecting an off-hook condition of the handset;
   a speakerphone switch; and
   control means, responsive to said hook switch means and to said speakerphone switch, for successively enabling and disabling at least one of said second microphone and said second speaker in response to successive operations of said speakerphone switch during the on-hook condition; and
   wherein said control means includes means for enabling said first microphone and said first speaker in response to a change from the on-hook condition to the off-hook condition and means for enabling said second speaker in response to the operation of said speakerphone switch during the off-hook condition.

2. Telephone apparatus as recited in claim 1, wherein said control means further includes means for successively disabling and enabling said first microphone in response to successive operations of said speakerphone switch during the off-hook condition.

3. Telephone apparatus as recited in claim 1, wherein said control means includes means for enabling said first microphone and said first speaker and for disabling said second microphone and said second speaker in response to a change from the on-hook condition to the off-hook condition.

4. Telephone apparatus as recited in claim 1, further comprising an additional switch and automatic control means, responsive to said additional switch, for automatically dialing a preselected telephone number, wherein said control means enables said second microphone and said second speaker in response to a signal from said automatic control means during the on-hook condition.

5. Telephone apparatus as recited in claim 1, further comprising:
   a selectively connectable headset having a third speaker; and
   a headset switch with a first state and a second state; and
   wherein said control means is responsive to said headset switch and includes means for enabling said second microphone and said second speaker when said speakerphone switch is operated a first time during the on-hook condition while said headset switch is in the first state, and means for enabling said second microphone and said third speaker when said speakerphone switch is operated a first time during the on-hook condition while said headset switch is in the second state.

6. Telephone apparatus as recited in claim 5, wherein said control means additionally includes means for disabling said second microphone when said speakerphone switch is operated a second time during the on-hook condition while said headset switch is in the second state and means for reenabling said second microphone when said speakerphone switch is operated a third time during the on-hook condition while said headset switch is in the second state.

7. Telephone apparatus for transmitting and receiving audio signals, comprising:
   a handset having a first microphone and a first speaker;
   speakerphone means having a second microphone and a second speaker;
   hook switch means for detecting an on-hook condition of the handset and for detecting an off-hook condition of the handset;
   a speakerphone switch; and
   control means, responsive to said hook switch means and to said speakerphone switch, for enabling said first microphone and said first speaker in response to a change from the on-hook condition to the off-hook condition and for enabling said second speaker when said speakerphone switch is operated a first time during the off-hook condition.

8. Telephone apparatus as recited in claim 7, wherein said control means includes means for disabling said first microphone when said speakerphone switch is operated a second time during the off-hook condition and means for reenabling said first microphone when said speakerphone switch is operated a third time during the off-hook condition.

9. Telephone apparatus as in claim 7, wherein said control means includes means for enabling said second microphone and for disabling said first microphone and said first speaker in response to a change from the off-hook condition to the on-hook condition.

10. Telephone apparatus as recited in claim 7, wherein said control means includes means for enabling said second microphone and said second speaker when said speakerphone switch is operated a first time during the on-hook condition and additionally includes means for disabling said second microphone when said speakerphone switch is operated a second time during the on-hook condition and means for reenabling said second microphone when said speakerphone switch is operated a third time during the on-hook condition.

11. Telephone apparatus as recited in claim 7, further comprising an additional switch and automatic control means, responsive to said additional switch, for automatically dialing a preselected telephone number, wherein said control means enables said second microphone and said second speaker in response to a signal from said automatic control means during the on-hook condition.

12. Telephone apparatus as recited in claim 7, further comprising:
   a selectively connectable headset having a third speaker; and
   a headset switch with a first state and a second state;
   wherein said control means is responsive to said headset switch; and wherein said control means includes means for enabling said second microphone and said second speaker when said speakerphone switch is operated a first time during the on-hook condition while said headset switch is in the first state and means for enabling said second microphone and said third speaker when said speakerphone switch is operated a first time during the on-hook condition while said headset switch is in the second state.

13. Telephone apparatus as recited in claim 12, wherein said control means additionally includes means for disabling said second microphone when said speakerphone switch is operated a second time during the on-hook condition whiles said headset switch is in the second state and means for reenabling said second microphone when said speakerphone switch is operated a third time during the on-hook condition while said headset switch is in the second state.

14. Telephone apparatus for transmitting and receiving audio signals, comprising:
   a handset having a first microphone and a first speaker;
   speakerphone means having a second microphone and a second speaker;
   a selectively connectable headset having a third speaker;
   hook switch means for detecting an on-hook condition of the handset and for detecting an off-hook condition of the handset;
   a speakerphone switch;
   a headset switch with a first state and a second state; and
   control means, responsive to said hook switch means and to said speakerphone and headset switches, for enabling said second microphone and said second speaker when said speakerphone switch is operated a first time during the on-hook condition while said headset switch is in the first state and for enabling said second microphone and said third speaker when said speakerphone switch is operated a first time during the on-hook condition while said headset switch is in the second state, wherein said control means includes means for disabling said second microphone when said speakerphone switch is operated a second time during the on-hook condition while said headset switch is in the second state and means for reenabling said second microphone when said speakerphone switch is operated a third time during the on-hook condition while said headset switch is in the second state.

15. Telephone apparatus as recited in claim 14, wherein said control means includes means for enabling said first microphone and said first speaker in response to a change from the on-hook condition to the off-hook condition while said headset switch is in the second state and means for enabling said second speaker when said speakerphone switch is operated a first time during the off-hook condition.

16. Telephone apparatus as recited in claim 15, wherein said control means further includes means for disabling said first microphone when said speakerphone switch is operated a second time during the off-hook condition while said headset switch is in the second state and means for reenabling said first microphone when said speakerphone switch is operated a third time during the off-hook condition while said headset switch is in the second state.

17. Telephone apparatus as in claim 15, wherein said control means includes means for enabling said second microphone and said third speaker and for disabling said first microphone, said first speaker, and said second speaker in response to a change from the off-hook condition to the on-hook condition while said headset switch is in the second state.

18. Telephone apparatus as recited in claim 14, wherein said control means includes means for disabling said second microphone and said third speaker and for enabling said first microphone and said first speaker in response to a change from the on-hook condition to the off-hook condition while said headset switch is in the second state.

19. Telephone apparatus as recited in claim 14, further comprising an additional switch and automatic control means, responsive to said additional switch, for automatically dialing a preselected telephone number, wherein said control means enables said second microphone and said third speaker in response to a signal from said automatic control means during the on-hook condition while said headset switch is in the second state.

20. A method of operating telephone apparatus of the type including a handset having a first microphone and a first speaker; speakerphone means having a second microphone and a second speaker; hook switch means for detecting off-hook and on-hook conditions of the handset; and a speakerphone switch; the method comprising the steps of:
 enabling the second microphone and the second speaker when the speakerphone switch is operated a first time during the on-hook condition;
 disabling the second microphone when the speakerphone switch is operated a second time during the on-hook condition;
 reenabling the second microphone when the speakerphone switch is operated a third time during the on-hook condition;
 enabling said first microphone and said first speaker in response to a change from the on-hook condition to the off-hook condition; and
 enabling the second speaker when the speakerphone switch is operated a first time during the off-hook condition.

21. A method as recited in claim 20, further comprising the steps of:
 disabling the first microphone when the speakerphone switch is operated a second time during the off-hook condition; and
 reenabling the first microphone when the speakerphone switch is operated a third time during the off-hook condition.

22. A method as recited in claim 20, further comprising the steps of:
 enabling the first microphone and the first speaker in response to a change from the on-hook condition to the off-hook condition; and
 disabling the second microphone and the second speaker in response to said change from the on-hook condition to the off-hook condition.

23. A method as recited in claim 20, further comprising the steps of:
 manually operating an additional switch;
 automatically dialing a preselected telephone number in response to the operation of the additional switch during the on-hook condition; and
 automatically enabling the second microphone and the second speaker in response to the operation of the additional switch during the on-hook condition.

24. A method of operating telephone apparatus of the type including a handset having a first microphone and a first speaker; speakerphone means having a second microphone and a second speaker; hook switch means for detecting an on-hook condition of the handset and for detecting an off-hook condition of the handset; and a speakerphone switch; the method comprising the steps of:
 enabling the first microphone and the first speaker in response to a change from the on-hook condition to the off-hook condition; and
 enabling the second speaker when the speakerphone switch is operated a first time during the off-hook condition.

25. A method as recited in claim 24, further comprising the steps of:
 disabling the first microphone when the speakerphone switch is operated a second time during the off-hook condition; and
 reenabling the first microphone when the speakerphone switch is operated a third time during the off-hook condition.

26. A method as recited in claim 24, further comprising the steps of:
 enabling the second microphone in response to a change from the off-hook condition to the on-hook condition; and
 disabling the first microphone and the first speaker in response to said change from the off-hook condition to the on-hook condition.

27. A method as recited in claim 24, further comprising the steps of:
 enabling the second microphone and the second speaker when the speakerphone switch is operated a first time during the on-hook condition;
 disabling the second microphone when the speakerphone switch is operated a second time during the on-hook condition;
 reenabling the second microphone when the speakerphone switch is operated a third time during the on-hook condition.

28. A method as recited in claim 24, further comprising the steps of:
 manually operating an additional switch;

automatically dialing a preselected telephone number in response to the operation of the additional switch during the on-hook condition; and automatically enabling the second microphone and the second speaker in response to the operation of the additional switch during the on-hook condition.

29. A method of operating telephone apparatus of the type including a handset having a first microphone and a first speaker; speakerphone means having a second microphone and a second speaker; a selectively connectable headset having a third speaker; hook switch means for detecting an on-hook condition of the handset and for detecting an off-hook condition of the handset; a speakerphone switch; and a headset switch with a first state and a second state; the method comprising the steps of:

enabling the second microphone and the second speaker when the speakerphone switch is operated a first time during the on-hook condition while the headset switch is in the first state;

manually operating an additional switch;

automatically dialing a preselected telephone number in response to the operation of the additional switch during the on-hook condition while the headset switch is in the second state; and automatically enabling the second microphone and the third speaker in response to the operation of the additional switch during the on-hook condition while the headset switch is in the second state.

30. A modular telephone/dictation system disposable in respective modes of operation for use by a user to carry out different system operating functions including a dictation function and a telecommunication function, said system comprising:

a recording module for recording dictation on a record medium; and a physically independent communication module connectable to said recording module to form an integral structure therewith and for transmitting and receiving audio signals telephonically, said communication module including a handset having a first microphone and a first speaker; speakerphone means having a second microphone and a second speaker; hook switch means for detecting an on-hook condition of the handset and for detecting an off-hook condition of the handset; a speakerphone switch; and control means, responsive to said hook switch means and to said speakerphone switch, for enabling said first microphone and said first speaker in response to a change from the on-hook condition to the off-hook condition and for enabling said second speaker when said speakerphone switch is operated a first time during the off-hook condition.

31. A method of operating telephone apparatus of the type including a handset having a first microphone and a first speaker; speakerphone means having a second microphone and a second speaker; a selectively connectable headset having a third speaker; hook switch means for detecting an on-hook condition of the handset and for detecting an off-hook condition of the handset; a speakerphone switch; and a headset switch with a first state and a second state; the method comprising the steps of:

enabling the second microphone and the second speaker when the speakerphone switch is operated a first time during the on-hook condition while the headset switch is in the first state; and enabling the second microphone and the third speaker when the speakerphone switch is operated a first time during the on-hook condition while the headset switch is in the second state;

enabling the first microphone and the first speaker in response to a change from the on-hook condition to the off-hook condition while the headset switch is in the second state; and enabling the second speaker when the speakerphone switch is operated a first time during the off-hook condition while the headset switch is in the second state.

32. A method as recited in claim 31, further comprising, after the step of enabling the first microphone and the first speaker and the step of enabling the second speaker, the steps of:

disabling the first microphone when the speakerphone switch is operated a second time during the off-hook condition while the headset switch is in the second state; and reenabling the first microphone when the speakerphone switch is operated a third time during the off-hook condition while the headset switch is in the second state.

33. A method as recited in claim 31, further comprising, after the step of enabling the first microphone and the first speaker and the step of enabling the second speaker, the steps of:

enabling the second microphone and the third speaker in response to a change from the off-hook condition to the on-hook condition while the headset switch is in the second state; and disabling the first microphone, the first speaker, and the second speaker in response to said change from the off-hook condition to the on-hook condition while the headset switch is in the second state.

34. A method as recited in claim 31, further comprising, after the step of enabling the second microphone and the third speaker, the steps of:

enabling the first microphone and the first speaker in response to a change from the on-hook condition to the off-hook condition while the headset switch is in the second state; and disabling the second microphone and the third speaker in response to said change from the on-hook condition to the off-hook condition while the headset switch is in the second state.

* * * * *